United States Patent
Berg

(10) Patent No.: US 7,385,703 B2
(45) Date of Patent: Jun. 10, 2008

(54) METHOD OF DETERMINING THE PRESSURE OF A GAS MIXTURE IN A VACUUM CONTAINER BY MEANS OF ABSORPTION SPECTROSCOPY

(75) Inventor: Thomas Berg, Gottingen (DE)

(73) Assignee: LaVision GmbH, Gottingen ( * ) Notice: Subject to any disclaimer, the term of this patent is extended or adjusted under 35 U.S.C. 154(b) by 0 days.

(21) Appl. No.: 11/637,334

(22) Filed: Dec. 12, 2006

(65) Prior Publication Data

US 2007/0165230 A1 Jul. 19, 2007

(30) Foreign Application Priority Data

Jan. 14, 2006 (DE) .................. 10 2006 001 902

(51) Int. Cl.
*G01N 21/00* (2006.01)
(52) U.S. Cl. ...................... 356/436; 356/437
(58) Field of Classification Search ............. 356/436, 356/437
See application file for complete search history.

(56) References Cited

U.S. PATENT DOCUMENTS

| 4,937,448 A |  | 6/1990 | Mantz et al. |
| 5,317,156 A | * | 5/1994 | Cooper et al. ............ 250/345 |
| 2005/0211901 A1 |  | 9/2005 | Crossmann et al. |

FOREIGN PATENT DOCUMENTS

WO 2005/040753 5/2005

OTHER PUBLICATIONS

William J. Kessler, Mark G. Allen, Steven J. Davis, Phillip A. Mulhall and Jan A. Polex, Physical Sciences Inc., 20 New England Business Center, Andover, MA 01810 1998 Photonics East, SPIE International, Symposium on Industrial and Environmental Monitors and Biosensors Nov. 2-5, 1998, Hynes Convention Center, Boston MA "Near-IR Diode Laser-Based Sensor For PPB-Level Water Vapor in Industrial Gases".

C S Edwards, G P Barwood, S A Bell, P Gill and M Stevens National Physical Laboratory, Queens Road, Teddington, Middlesex TW11 0LW, UK Received Mar. 22, 2001, accepted for publication Apr. 30, 2001 "A tunable diode laser absorption spectrometer for moisture measurements in the low parts in $10^9$ range".

* cited by examiner

*Primary Examiner*—Roy M Punnoose
(74) *Attorney, Agent, or Firm*—Thomas R. Vigil

(57) ABSTRACT

The method of determining, by absorption spectroscopy, the pressure of a gas mixture in a vacuum container located in an environment containing the gas to be measured, and the pressure of the gas is different from that in the vacuum container. A device comprising a laser and a laser detector measures an absorption curve $A_R(\lambda)$ of the gas in the beam path between the laser and the detector. The vacuum container is placed into the beam path and the absorption curve $A_M(\lambda)$ of the gas is determined in the beam path into which the vacuum container has been placed and the absorption curve $A_R(\lambda)$ is made to coincide by compression with the absorption curve $A_M(\lambda A)$ outside of the absorption curve of the gas, the extent of compression being determined by a proportionality factor c, the following relation for determining the gas to be measured in the vacuum container being:
$A_G(\lambda) = A_M(\lambda) - c \cdot A_R(\lambda)$.

3 Claims, 2 Drawing Sheets

METHOD OF DETERMINING THE PRESSURE OF A GAS MIXTURE IN A VACUUM CONTAINER BY MEANS OF ABSORPTION SPECTROSCOPY

FIELD OF THE INVENTION

The invention relates to a method of determining the pressure of a gas or gas mixture in a vacuum container by means of absorption spectroscopy.

In medical engineering, powder products are often stored in vials. In manufacturing or filling such type vials, the problem arising is that it must be made certain that a negative pressure prevails inside these vials in order to ensure that the product stored in the vial will not be damaged by air penetrating into the vial during storage.

This means that such type vials must be checked to see whether certain ambient gases such as water vapor e.g., are contained in these vials in order to see from the water vapor concentration in the vial whether the vacuum is still intact.

In this context, two measurement methods of determining the hydrogen partial pressure or the gas volume in the vial are known.

DESCRIPTION OF THE PRIOR ART

According to known prior art (WO 2005/040753 A2), a chamber is provided into which a vial is placed for checking. Assuming that the height of the partial pressure levels of water vapor in the vial is a measure of the quality of the vacuum leads to the conclusion that it is necessary to determine the amount of water vapor in the vial. This known method uses absorption spectroscopy. Insofar, it must be made certain that in the measurement path, meaning outside of the vial, that gas should not be contained that is to be evidenced in the vial, in the present case water vapor for example. Accordingly, it is provided that, after the vial has been introduced into the chamber, said chamber is flushed with a gas different from the one to be determined in the vial. That is to say that, if water vapor is to be determined, the chamber is flushed with dry air for the partial pressure of the water vapor in the single vial to be determined by absorption spectroscopy.

It is obvious that such a dry air flush must be repeated for each vial. After the chamber has been flushed with dry air, a measurement must be carried out to check whether the gas to be measured in the vial has been evacuated from the chamber. Once this has been made certain, the actual measurement for determining the gas concentration in the vial is performed. Flushing the chamber with dry air after each vial is expensive in terms of time and cost since a considerable amount of energy is needed to dry the air. Moreover, it must be ensured that the chamber is tight since leakage may corrupt the measurement.

The spectroscopic measurement method underlying this method is based on the absorption of narrow band radiation from tunable diode lasers (English: TDLAS for tunable diode laser absorption spectroscopy. For this purpose, the vial is placed in the beam path of the laser. The intensity of laser radiation is recorded by a detector, e.g., a photodiode from the side opposite the emitter (laser). The central laser wavelength is thereby tuned to the absorption maximum of a standalone absorption curve at 1358 nm for water vapor for example. Such a diode laser can very easily be put out of tune by its central wavelength, the tuning range typically amounting to some few wave numbers. This allows for completely covering the absorption line of the water vapor contained in the absorption path. The absorbance is determined as follows:

$$A(\lambda) = ln\left(\frac{I_0(\lambda)}{I(\lambda)}\right),$$

wherein $I_0$, $I$ is the light intensity before and after absorption. To determine $I_0$, $I$, methods are known from prior art (M. Lackner et al., In-Situ Laser Spectroscopy of CO, $CH_4$ and $H_2O$ in a Particle Laden Laboratory-Scale Fluidized Bed Combustor, Thermal Science: Vol. 6 (2002), No. 2, pp. 13-27) to eliminate the influence of interferences such as by the wall of the vial.

If the laser beam passes through the container, the laser beam is absorbed by the water molecules contained in the vessel. Additionally, the laser is also absorbed by the water molecules contained in the exterior air if these were contained in the ambient air. Accordingly, there is provided in prior art to flush the chamber with dry air so that water vapor is eliminated from the beam path.

Another method known from prior art (the Beer-Lambert Law) for determining the partial pressure of water vapor in a vial by absorption spectroscopy relies on the following considerations:

For determining the absorption curve in the vacuum container, the following relation applies: $A_G(\lambda)=A_M(\lambda)-c\cdot A_R(\lambda)$.

$A_G(\lambda)$: absorption curve vacuum container;

$A_M(\lambda)$: absorption curve of the measurement with the vacuum container placed in the beam path;

$A_R(\lambda)$: absorption curve as with $A_M$, but without vacuum container in the beam path.

The relation $A_G(\lambda)=A_M(\lambda)-c\cdot A_R(\lambda)$ also applies if the derivations rather than the absorption curves are determined, this making the measurement more sensitive. In the TDLAS technique, this occurs through high-frequency modulation of the laser light (P, Werke et al., Near and Mid-Infrared Laser Optical Sensors for Gas Analysis, Optics and Lasers in Engineering 37 (2002) 101-114). This means that the invention comprises both the measurement in which absorbance is determined directly and methods yielding the derivation of the absorbance.

The proportionality constant in the relation $A_G(\lambda)=A_M(\lambda)-c\cdot A_R(\lambda)$ is substantially determined by the measurement length U of the beam path and by the diameter of the vial or vacuum container. The diameter of the vacuum container is naturally known. What is unknown is the length of the beam path though. The length of the beam path is also very difficult to determine since the entire distance between laser and detector are also included in U, that is to say, also and in particular the measurement length within the various instruments so that U is almost impossible to determine correctly. Further, it must be made certain that the gas to be measured is at the same concentration over the entire length, that is, not only in the free distance between the laser emitter and the detector but also within the various instruments. This cannot be ensured either, this being the reason why this method of measurement is cheaper than the first measurement method mentioned but is also much more inaccurate or the expenditure in terms of measuring technique is much higher than with the first method.

BRIEF SUMMARY OF THE INVENTION

It is therefore the object of the invention to provide a method of determining the pressure of a gas or gas mixture in a vacuum container by means of absorption spectroscopy that is located in an environment also containing the gas to be measured, but at a pressure different than that prevailing in the vacuum container, said method involving little expense on the one side and ensuring high reliability with regard to determining the gas to be measured in the vacuum container (vial) and being moreover cheap to carry out.

The method of the invention for determining, by means of absorption spectroscopy, the pressure of a gas or gas mixture in a vacuum container located in an environment also comprising the gas to be measured, but at a pressure different from that in the vacuum container, is characterized, in accordance with the invention, by a laser and a laser detector that are spaced apart from each other, the absorption curve $A_R(\lambda)$ of the gas to be determined being determined in the beam path between laser and detector in a first step, the vacuum container being placed into the beam path and the absorption curve $A_M(\lambda)$ of the gas to be determined being determined in the beam path into which the vacuum container has been placed in a second step, that the absorption curve $A_R(\lambda)$ is made to coincide by compression with the absorption curve $A_M(\lambda)$ outside of the absorption curve of the gas to be measured, the extent of compression being determined by a proportionality factor c, the following relation applying for determining the gas to be measured in the vacuum container:

$$A_G(\lambda) = A_M(\lambda) - c \cdot A_R(\lambda).$$

The method of the invention relies on the following consideration:

At first, it is assumed that $A_R(\lambda)$ and $A_M(\lambda)$ are determined one immediately after the other so that ambient pressure and temperature are substantially the same in both measurements. Further, it is known that an increase of pressure involves a spectral widening of the absorption curve. This means that the absorption curve in the beam path is much wider than the absorption curve in the vacuum container, with the gas to be measured being the same.

As already explained, the method of the invention consists of a plurality of steps, in the first step that absorption curve $A_R(\lambda)$ being determined that is obtained by the fact that the absorption curve of the gas to be measured in the vial, for example water vapor, is determined in the beam path without vacuum container. In the second step for determining the absorption curve $A_M(\lambda)$, with the vacuum container being placed in the beam path, the laser beam is absorbed by the water molecules contained in the container. Additionally, the laser is also absorbed by the water molecules contained in the air in the environment of the beam path.

Determining for the absorption curve is on the one side the density of the water molecules or the height of the partial pressure of the water vapor and on the other side the path length, i.e., the length between the laser emitter and the laser detector, and the pressure and temperature. This is to say that the absorbance is proportional to the density of the molecules and also proportional to the path length of the laser light, meaning of the path length of the absorption. The line width $\Delta(\lambda)$ of the absorption curve, by contrast, is independent of these variables but instead dependent on the pressure p, the temperature T and the composition of the gas. As already explained herein above, pressure and temperature should be the same everywhere except for the vacuum container where negative pressure prevails. The path length of the air in both measurements of $A_R(\lambda)$ and $A_M(\lambda)$ however only differs by the diameter of the vacuum container (vial). As already explained, ambient p and T are assumed to be constant. Taking more particularly into consideration the fact that the line width depends on the pressure, and that accordingly the absorption curve of $A_M(\lambda)$ and $A_R(\lambda)$ is wider that the absorption curve $A_G(\lambda)$, this means that the absorption curves $A_M(\lambda)$ and $A_R(\lambda)$ are greater than 0 in the border zones, with $A_G(\lambda)$ being almost equal to 0 in these border zones. The differences between $A_M(\lambda)$ and $A_R(\lambda)$ are only in the differing path length because of the container placed in the beam path, since all the other factors are assumed to be equal or constant. Accordingly, the course of the absorption curves of $A_M(\lambda)$ and of $A_R(\lambda)$, that is, the configuration or shape of these curves, is the same. Meaning, the curves only differ by a proportionality factor c in the form of $$c = \frac{A_M(\lambda)}{A_R(\lambda)}$$

in the border zones of the absorption curves. The possibility of having $A_M(\lambda)$ coinciding with $A_R(\lambda)$ through the factor c allows for eliminating the influence of the ambient air onto the measurement. This allows determining from $A_M(\lambda)$ and $A_R(\lambda)$ the absorption spectrum $A_G(\lambda)$ in the container according to $A_G(\lambda) = A_M(\lambda) - c \cdot A_R(\lambda)$.

Considering the fact that, due to the increased pressure, the absorption curve $A_M(\lambda)$ and the absorption curve $A_R(\lambda)$ have a wider line than the absorption curve $A_G(\lambda)$ of the container, there is the possibility to compress the curve $A_R(\lambda)$ in these border zones in such a manner in a relation that this curve coincides with the curve $A_M(\lambda)$ in the border zones in which $A_G(\lambda)$ is equal to 0. The extent of compression now indicates the proportionality factor c through which the curves $A_M(\lambda)$ and $A_R(\lambda)$ differ in the border zone.

According to a particular feature of the invention, there is provided that the extent of compression of the absorption curve $A_R(\lambda)$ onto the absorption curve $A_M(\lambda)$ outside of the absorption curve of the gas, to be measured is determined by the ratio of the surface areas beneath a respective one of the absorption curves $A_R(\lambda)$ and $A_M(\lambda)$ to the X axis (wavelength) outside of the absorption curve of the gas to be measured with the following relation:

$$c \cong (F_{M1} + F_{M2}) : (F_{R1} + F_{R2}) \cong F_{M1} : F_{R1}.$$

Another variant for determining the proportionality factor c relies on the observation that the extent of compression of the absorption curve $A_R(\lambda)$ onto the absorption curve $A_M(\lambda)$ outside of the absorption curve of the gas to be measured is determined by the relation $A_M(\lambda) \cong c \cdot A_R(\lambda)$, the proportionality constant c being determined from $A_M(\lambda)$ and $A_R(\lambda)$ by approximation using the method of the smallest square deviations.

The invention will be explained in closer detail hereinafter by way of example with reference to the drawings.

DETAILED DESCRIPTION OF THE INVENTION

Referring to the example, it will be assumed herein after that the water vapor partial pressure in the vacuum container is to be determined. Of course, any other gas contained in the environment and in the container can be determined. The important point however is that the ambient pressure is substantially higher than that prevailing in the container.

Figure 1:
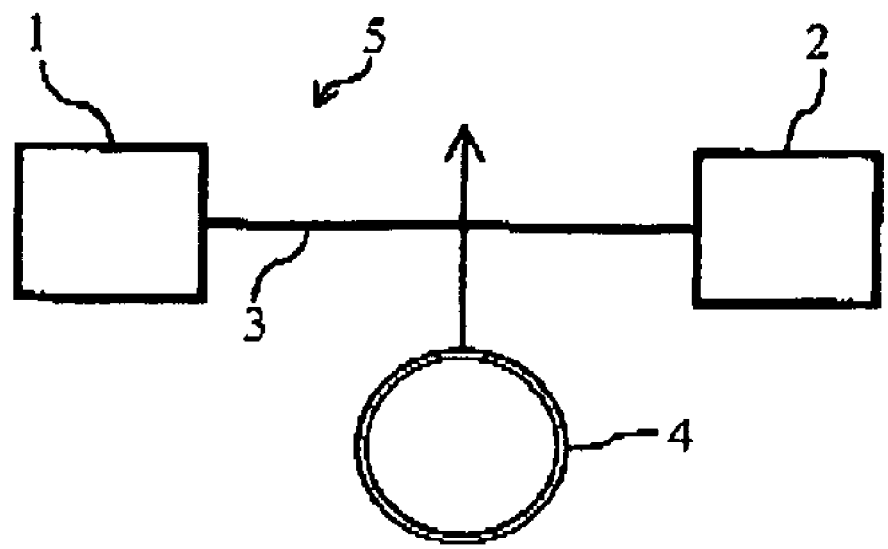
FIG. 1 is a test array, comprising a laser emitter and a laser detector.
Figure 2:
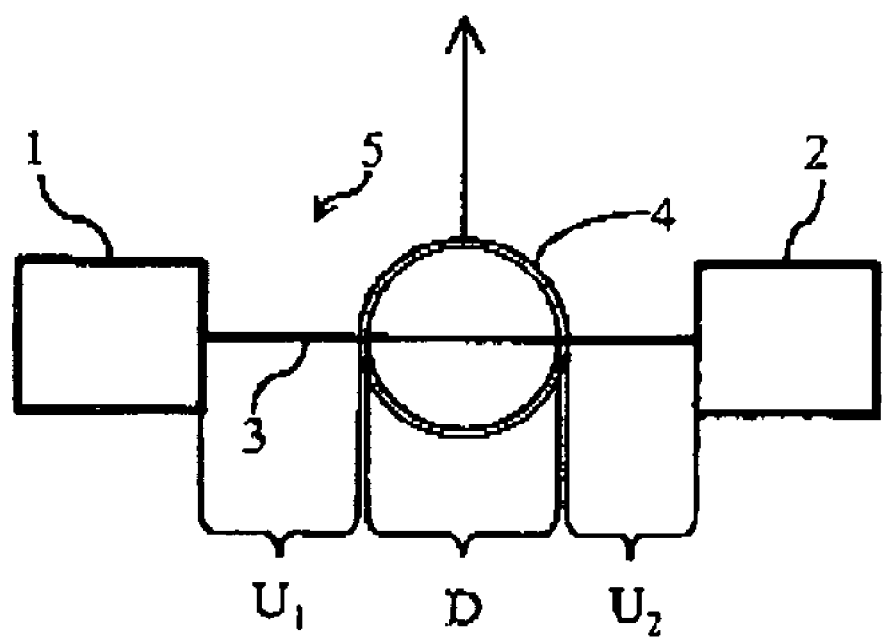
FIG. 2 is a test array according to FIG. 1, a vacuum container (vial) being placed in the beam path between laser emitter and laser detector.

Referring to FIG. 1, the laser is indicated at 1, the laser detector for measuring the laser power at 2, the laser beam at 3, the vacuum container at 4 and the ambient air at 5. In the test array of FIG. 1, the laser beam does not pass through the vacuum container 4, that is to say that what is determined with this test array is the absorption curve $A_R(\lambda)$. The test array of FIG. 2 serves to determine the absorption curve $A_M(\lambda)$. Here, the vacuum container 4 has been placed entirely into the beam path 3, that is to say that the laser beam traverses the container exactly in the center thereof. The distance traveled by the beam inside the vacuum container 4 is indicated at D. On this portion of the beam path, the laser beam is absorbed by the water molecules inside the container, the density of said molecules being determined with the help of the method of the invention. Outside of the container, the laser beam traverses the ambient gas, such as air, the entire path being divided into portions U1 and U2, meaning into a region located in front of the vacuum container and a region located behind it. On these path portions, the laser beam is absorbed by the water molecules of the ambient gas for example. As already explained, the absorption line $A_M(\lambda)$ is determined by the measurement array of FIG. 2. The determination of the absorption line of the water vapor in the vacuum container is determined with $A_G(\lambda)=A_M(\lambda)-c \cdot A_R(\lambda)$. That is to say that, during measurement, the absorbance is composed of a fraction of water molecules contained in the ambient air and of water molecules contained inside the container. As already explained herein above, the line width is a function of the pressure. Meaning, the line width of $A_M(\lambda)$ and $A_R(\lambda)$ is much wider than the width of the line $A_G(\lambda)$ since a negative pressure is prevailing in the container 4. It should be noted that good measurement results are obtained if the ratio between the pressure in the container and the ambient pressure $P_G:P_U$ is about 1:5.

Figure 3:
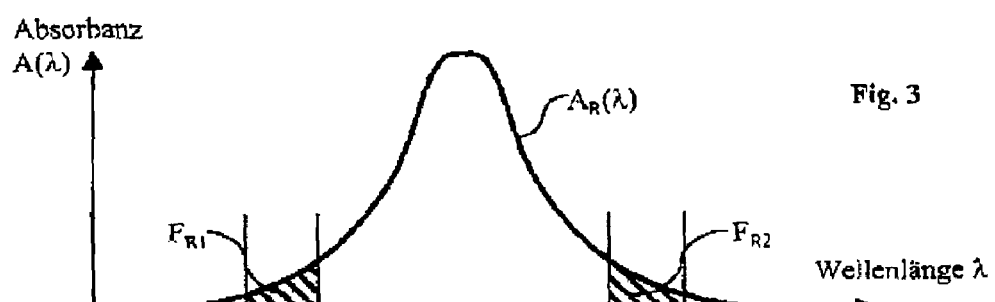
FIG. 3 shows an absorption curve $A_R(\lambda)$.
Figure 4:
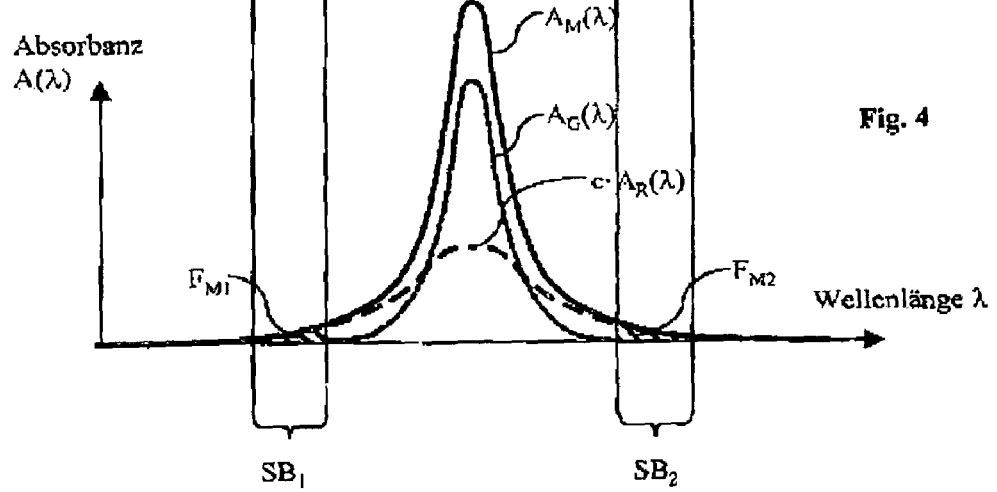
FIG. 4 shows the curves $A_M(\lambda)$, $A_G(\lambda)$ and $c \cdot A_R(\lambda)$, each being plotted against the wavelength $\lambda$.

Reviewing the FIGS. 3 and 4 in this context, the following becomes apparent:

FIG. 3 shows the course of the absorption curve $A_R(\lambda)$. FIG. 4 on the one side shows the absorption curve $A_M(\lambda)$ as well as the curve $c \cdot A_R(\lambda)$. It is known that the absorption curve $A_G(\lambda)$ tends to 0 in the border zones $SB_1$ and $SB_2$. As already explained herein above, the curves $A_M(\lambda)$ and $A_R(\lambda)$ are identical in course, that is in shape, in their constituent parts, except for their size. The size difference is only due to the fact that the vacuum container with the water vapor is located in the beam path in $A_M(\lambda)$. Since, except for the path length due to the diameter of the vacuum container in the beam path (see FIG. 2), all of the other factors determining the course of both the absorption curves $A_M(\lambda)$ and $A_R(\lambda)$ are assumed to be equal or constant, the size difference of the absorption curves $A_M(\lambda)$ and $A_R(\lambda)$ is due to the different distance the laser beam is travelling. Since in the regions $SB_1$ and $SB_2$ the absorption $A_G(\lambda)$ of the vacuum container tends toward 0, the curve $A_R(\lambda)$ there may be compressed to such an extent that it comes to coincide with the absorption curve $A_M(\lambda)$. The extent of compression represents the proportionality factor c by which the curve $A_R(\lambda)$ must be compressed to coincide with $A_M(\lambda)$ in the regions $SB_1$ and $SB_2$.

Accordingly, the proportionality factor is determined by approximation, e.g., from the ratio of the surface areas as follows:

$$c \approx (F_{M1}+F_{M2}):(F_{R1}+F_{R2}) \approx F_{M1}:F_{R1}.$$

Another possibility of determining the proportionality factor c is in using the method of the smallest square deviations. Here, it applies that $A_M(\lambda)$ is approximately equal to $c \cdot A_R(\lambda)$ for wavelengths $\lambda$ within $SB_1$ and $SB_2$. Using the method of the smallest square deviation, the proportionality factor c may be determined by approximation from the measurement data $A_M(\lambda)$ and $A_R(\lambda)$ within the spectral ranges $SB_1$ and $SB_2$.

As a rule, the curves are digitalized so that the curve $A_M(\lambda)$ is represented by a series of data $A_{M,i}$ and $A_R(\lambda)$, by a series of data $A_{R,i}$, i being the index on the entries of the data series.

The amount SB contains all the indices of data points within the ranges $SB_1$ and $SB_2$, meaning where the curves are to be adapted.

Accordingly, the expression $$\sum_{i \in SB} (A_{M,i} - c \cdot A_{R,i})^2$$

must be minimized.

The solution is obtained if the zero points of the derivation of the expression are determined:

$$0 = \frac{\partial}{\partial c}\left[\sum_{i \in SB}(A_{M,i}-c \cdot A_{R,i})^2\right]$$

$$= \sum_{i \in SB} 2(A_{M,i}-c \cdot A_{R,i})(-A_{R,i})$$

$$= 2\sum_{i \in SB}(-A_{M,i} \cdot A_{R,i}) + 2c\sum_{i \in SB} Ai \Rightarrow c\sum_{i \in SB} A_{R,i}^2$$

$$= \sum_{i \in SB}(A_{M,i} \cdot A_{R,i}) \Rightarrow c$$

$$= \frac{\sum_{i \in SB}(A_{M,i} \cdot A_{R,i})}{\sum_{i \in SB} A_{R,i}^2}$$

This allows determining c directly from the data series of the digitalized absorption curves.

The quality of the vacuum or of the residual gas content, meaning the partial pressure of the gas to be measured can be determined from the proportionality factor c and the absorption curve $A_G(\lambda)$. This insofar as the surface area beneath the absorption curve is substantially proportional to the water vapor partial pressure and to the known inner diameter of the vial. The residual humidity in the vial can be determined therefrom. To a limited extent, the line width $\Delta(\lambda)$ of the absorption curve $A_G(\lambda)$ allows inferring therefrom the overall inner pressure.

I claim:

1. A method of determining, by means of absorption spectroscopy, the pressure of a gas or gas mixture in a vacuum container located in an environment that also contains the gas to be measured, wherein the pressure of the gas is different from that in the vacuum container, comprising a laser and a laser detector, the absorption curve $A_R(\lambda)$ of the gas to be determined being determined in the beam path between laser and detector in a first step, the vacuum container being placed into the beam path and the absorption curve $A_M(\lambda)$ of the gas to be determined being determined in the beam path into which the vacuum container has been placed in a second step, that the absorption curve $A_R(\lambda)$ is made to coincide by compression with the absorption curve $A_M(\lambda)$ outside of the absorption curve of the gas to be measured, the extent of compression being determined by a proportionality factor c, the following relation applying for determining the gas to be measured in the vacuum container: $A_G(\lambda) = A_M(\lambda) - c \cdot A_R(\lambda)$.

2. The method as set forth in claim 1, wherein the extent of compression of the absorption curve $A_R(\lambda)$ onto the absorption curve $A_M(\lambda)$ outside of the absorption line of the gas to be measured is determined by the ratio of the surface areas beneath a respective one of the absorption curves $A_R(\lambda)$ and $A_M(\lambda)$ to the X axis outside of the absorption curve of the gas to be measured with the following relation:

$$F_{M1} : F_{R1} \cong (F_{M1} + F_{M1}) : (F_{R1} + F_{R2}) = c.$$

3. The method as set forth in claim 1, wherein the extent of compression of the absorption curve $A_R(\lambda)$ onto the absorption curve $A_M(\lambda)$ outside of the absorption line of the gas to be measured is determined by the relation $A_M(\lambda)$ approximately equal to $c \cdot A_R(\lambda)$, the proportionality constant c being determined from $A_M(\lambda)$ and $A_R(\lambda)$ by approximation, using the method of the smallest square deviations.

* * * * *